US006457131B2

(12) United States Patent
Kuemerle (10) Patent No.: US 6,457,131 B2
(45) Date of Patent: Sep. 24, 2002

(54) SYSTEM AND METHOD FOR POWER OPTIMIZATION IN PARALLEL UNITS

(75) Inventor: Mark William Kuemerle, Winooski, VT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/832,064

(22) Filed: Apr. 10, 2001

Related U.S. Application Data

(62) Division of application No. 09/228,884, filed on Jan. 11, 1999.

(51) Int. Cl.[7] .................................................. G06F 1/26
(52) U.S. Cl. ...................... 713/300; 713/330; 713/340
(58) Field of Search ................................ 713/300–340; 365/226–229

(56) References Cited

U.S. PATENT DOCUMENTS

| | | | | |
|---|---|---|---|---|
| 5,220,671 A | 6/1993 | Yamagishi | ................... | 395/750 |
| 5,339,445 A | 8/1994 | Gasztonyi | ................... | 395/750 |
| 5,361,392 A | 11/1994 | Fourcroy et al. | ........... | 395/800 |
| 5,481,733 A | 1/1996 | Douglis et al. | ............. | 713/300 |
| 5,560,024 A | 9/1996 | Harper et al. | ............... | 395/750 |
| 5,579,524 A | 11/1996 | Kikinis | ....................... | 395/750 |
| 5,613,130 A | 3/1997 | Teng et al. | ................. | 395/750 |
| 5,650,939 A | 7/1997 | Yoshida | ..................... | 364/492 |
| 5,825,674 A | 10/1998 | Jackson | ..................... | 364/707 |
| 5,958,041 A | 9/1999 | Petolino, Jr. et al. | ....... | 712/214 |
| 5,991,105 A | * 11/1999 | Sasaki | ......................... | 360/46 |
| 6,304,978 B1 | * 10/2001 | Horigan et al. | ............. | 713/322 |

OTHER PUBLICATIONS

Nielsen et al. "Low–Power Operation Using Self–Timed Circuits and Adaptive Scaling of the Supply Voltage", IEEE Transactions on Very Large Scale Integration (VLSI) Systems, vol. 2, No. 4, Dec. 1994, pp 391–397.*
L.S. Nielsen, et al. "Low–Power Operation Using Self–Timed Circuits and Adaptive Scaling of the Supply Voltage", *IEEE Transactions on Very Large Scale Integration (VLSI) Systems*, vol. 2, No. 4, Dec. 1994, pp. 391–397.
R. K. Krishnamurthy, et al. "Exploring the Design Space of Mixed Swing QuadRail for Low–Power Digital Circuits", *IEEE Transactions on Very Large Scale Integration (VLSI) Systems*, vol. 5, No. 4, Dec. 1997, pp. 388–400.

* cited by examiner

*Primary Examiner*—Ario Etienne
(74) *Attorney, Agent, or Firm*—Shelley M Beckstrand (57) ABSTRACT

A plurality of parallel execution units are selectively powered from a plurality of power sources, the power to each execution unit being selected based upon expected time to completion of processing within the execution unit. Maximum power is gated to execution units executing complex instructions, or time-critical instructions. Less than maximum power is gated to execution units executing simple instructions, or instructions which are not time-critical, or in response to pipeline hazards or stalls. When less than maximum power is gated to an execution unit, a step up circuit may be employed to raise the output of that execution unit to maximum power.

24 Claims, 9 Drawing Sheets

SYSTEM AND METHOD FOR POWER OPTIMIZATION IN PARALLEL UNITS

This application is a divisional of U.S. patent application Ser. No. 09/228,884 filed Jan. 11, 1999 by Mark W. Kuemerle for System and Method for Power Optimization in Parallel Units.

BACKGROUND OF THE INVENTION

1. Technical Field of the Invention

This invention pertains to circuit chip powering. More specifically, it relates to providing to individual functional units a selectable power supply, thereby increasing processing speed while reducing power consumption.

2. Background Art

Computers are becoming faster with each passing development cycle. Much of this increase in speed is due to ever smaller component and interconnection technologies used in manufacturing the microprocessors. With transistor densities increasing by an estimated 50% per year, technology is expected to reach a point where it becomes prohibitively expensive to improve the size of a transistor.

The possibility of these technological limits will soon make it more and more difficult for computer designers to gain the yearly speedup necessary to perpetuate Moore's law. Thus, in order to continue to achieve performance gains, new methods must be used to push computer design to new limits. One of these methods is asynchronous design.

An advantage of asynchronous logic in a microprocessor is its low power consumption when compared with similar synchronous logic. Asynchronous logic, operating in an unclocked domain, consumes much less power due to the fact that there are no logic transitions based on a clock. Consequently, the speed and power consumption of any piece of asynchronous logic will be dependent on the data and the voltage supplied to the logic gates.

A common method of improving the performance of asynchronous logic has been to increase the power supply voltage. This increased voltage makes logic gates function much more rapidly. Unfortunately, the power consumed in the transition of a circuit, which is due to a brief short circuit current, is proportional to the supply voltage. Thus, when asynchronous logic designers increase the speed of their chips by increasing the voltage of the power supply, they also increase the power needed to drive the logic. In most cases the asynchronous chip is powered by the same voltage source throughout. This source even supplies units that are executing functions that cannot be applied until after some critical function has completed, as would be the case of an in-order chip executing two instructions in parallel. This increased voltage supply throughout the chip executes the critical instruction more rapidly, but also causes other units executing non-critical instructions to use more power, thus dissipating more heat and draining batteries faster.

As an example of this problem, consider the case of an asynchronous fixed point unit with the ability to execute multiply and add instructions simultaneously. An instruction pipeline would typically have a multiply instruction in the execute stage and an add instruction in the decode stage simultaneously. It would execute the multiply instruction, while adding any referenced registers to its list of dependencies. Shortly afterward it might find that the add instruction used no registers with data dependency. It would then use the adder in the fixed point unit to execute the add instruction. An in-order chip would most likely wait for the multiply instruction to complete, update the appropriate registers, then update registers for the add instruction. If the add instruction took less time than the multiply instruction, then the adder would be held until its results could be applied to the machine registers, doing no useful work while it is being held. If the adder were to use the same power supply as the multiplier in this example, the speed advantage gained by the adder from the extra voltage would be useless since the adder is held from completion until after the divide instruction is finished. If the adder were to be given a lower supply voltage during the execution of the add instruction than that given to the multiplier, the adder would save a considerable amount of power without effecting the overall performance of the chip.

It is an object of the invention to provide an improved system and method of chip powering.

It is a further object of the invention to provide an improved system and method of chip powering which increases processing speed while reducing power consumption.

It is a further object of the invention to provide an improved system and method of chip powering where individual execution units are provided selectable power to increase processing speed in critical units while reducing power in less critical units without delaying completion of processing in the critical units.

SUMMARY OF THE INVENTION

In accordance with the invention, a system and method is provided for selectively powering execution units from a plurality of power sources, the power to each execution unit being selected based upon expected time to completion of processing within the execution unit.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
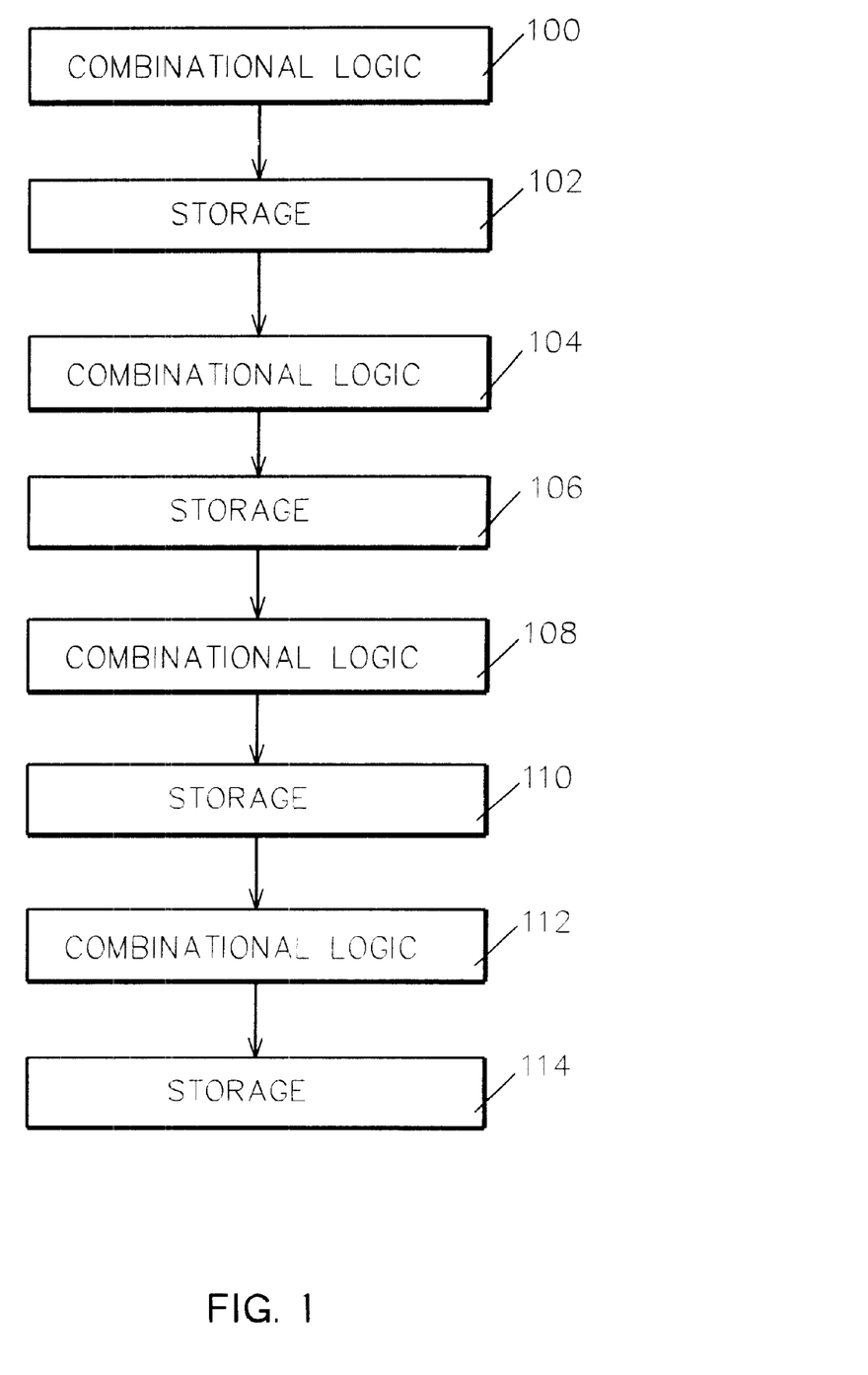
FIG. 1 is a timing chart illustrating asynchronous data transfer.

Referring to FIG. 1, a typical pipelined unit is depicted including a plurality of combinational logic segments 100, 104, 108, 112 followed, respectively, by storage segments 102, 106, 110, and 114. Such a pipelined unit may operate asynchronously or synchronously. If it is asynchronous then the storage segments 102, 106, 110 and 114 will be activated when the combinational logic before it has completed. If it is synchronous the storage segments will be activated by the clock (not shown) every clock cycle.

Figure 2:
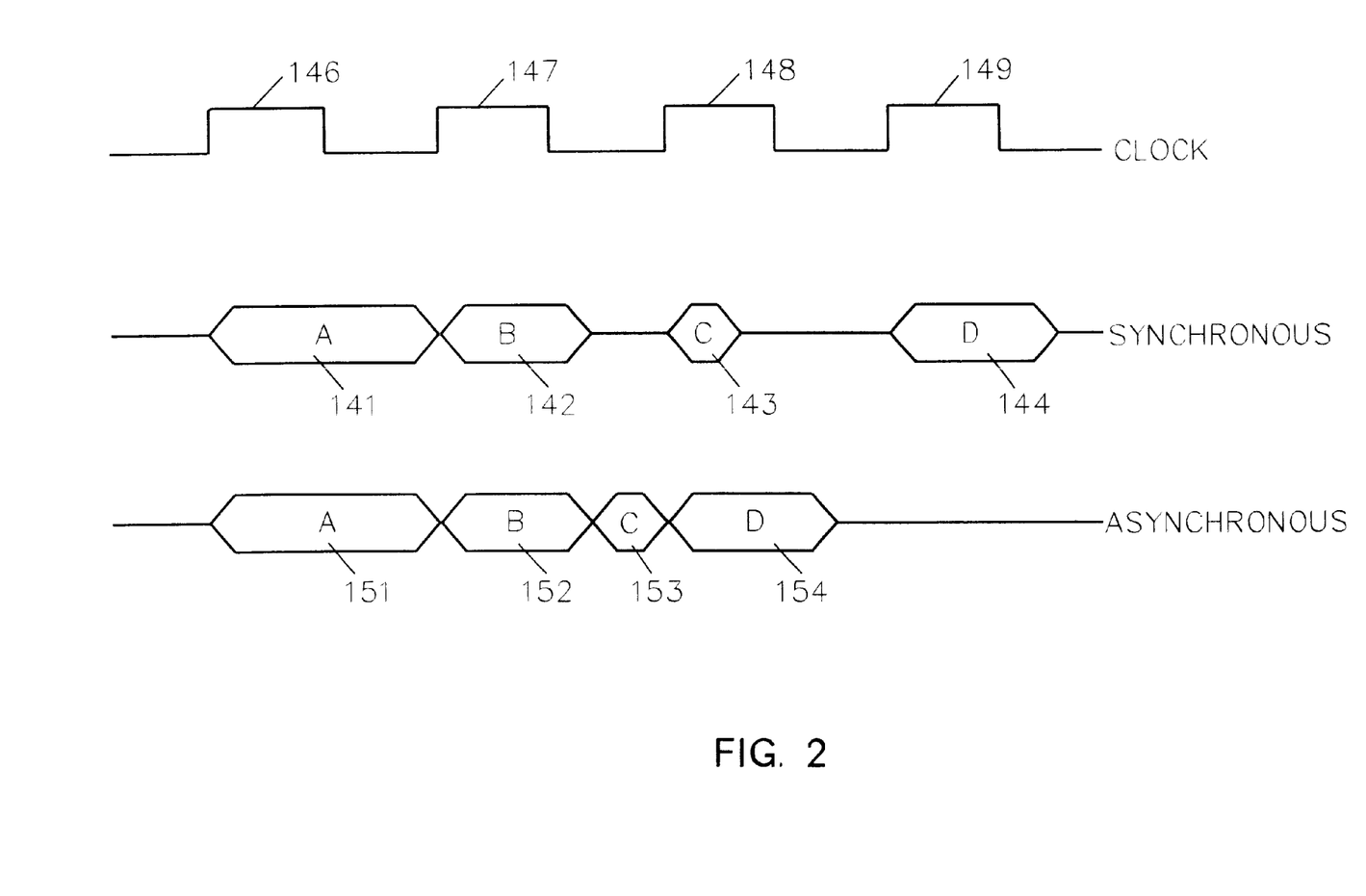
FIG. 2 is a timing chart illustrating synchronous and asynchronous operation.

Referring to FIG. 2, the difference between synchronous and asynchronous operation is further depicted. Operations 141–144 and 151–154 have time durations A, B, C, and D, respectively. Referring to FIG. 2 in connection with FIG. 1, if a pipeline is operating asynchronously, a storage segment 102 will be activated when the preceding combinational logic stage 100 has completed. It is not clocked. If the pipeline is operating synchronously, a storage segment 102 will be activated very clock cycle 146-149 by the clock. A time lag, such as is illustrated between operations 142 and 143, and between operations 143 and 144, occurs in synchronous operations, for such operations must complete before a clock 146-149 change—a change which is required to trigger a subsequent operation.

Figure 3:
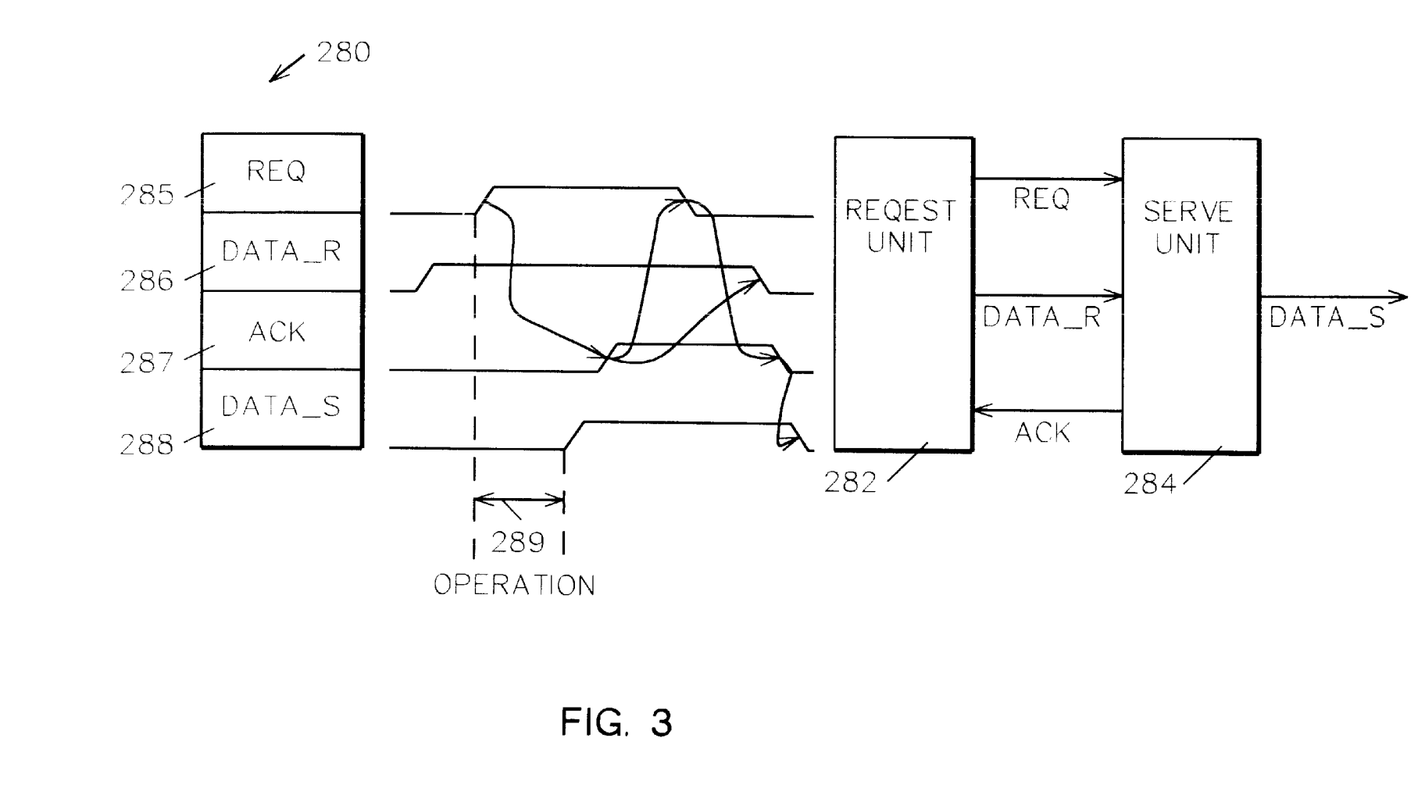
FIG. 3 is a timing diagram illustrating asynchronous data transfer.

Referring to FIG. 3, asynchrony of a circuit chip, which is implemented without the use of clock, requires that a method be used to guarantee that an operation has completed. As shown, in order to assure an asynchronous design, each component 280 is implemented with a series of requests 285 and acknowledges 287 surrounding any data transfer operations 289, such as DATA_R 286. As used herein, a request 285 may be referred to as a "go" or "req", while an acknowledge 287 is referred to as a "done" or "ack".

In addition to the request/acknowledge protocol used to assure completion of data transfers, standard logic components, such as a full adder, latch, or shifter, which contains no hardware to indicate its completion status and assumes completion at the end of the clock cycle given to it, must have some additional logic included to detect completion. In some cases, as in most combinational logic, this can be done by simultaneously computing the inverse function for each bit and waiting for the two to differ. In other cases, as in latches, one dummy signal is propagated into the device, and then checked on the output for correctness before the outputs can be guaranteed stable. In either case, these protocols must be used in even the smallest of components to assure that the unit as a whole operates in a consistent fashion.

Figure 4:
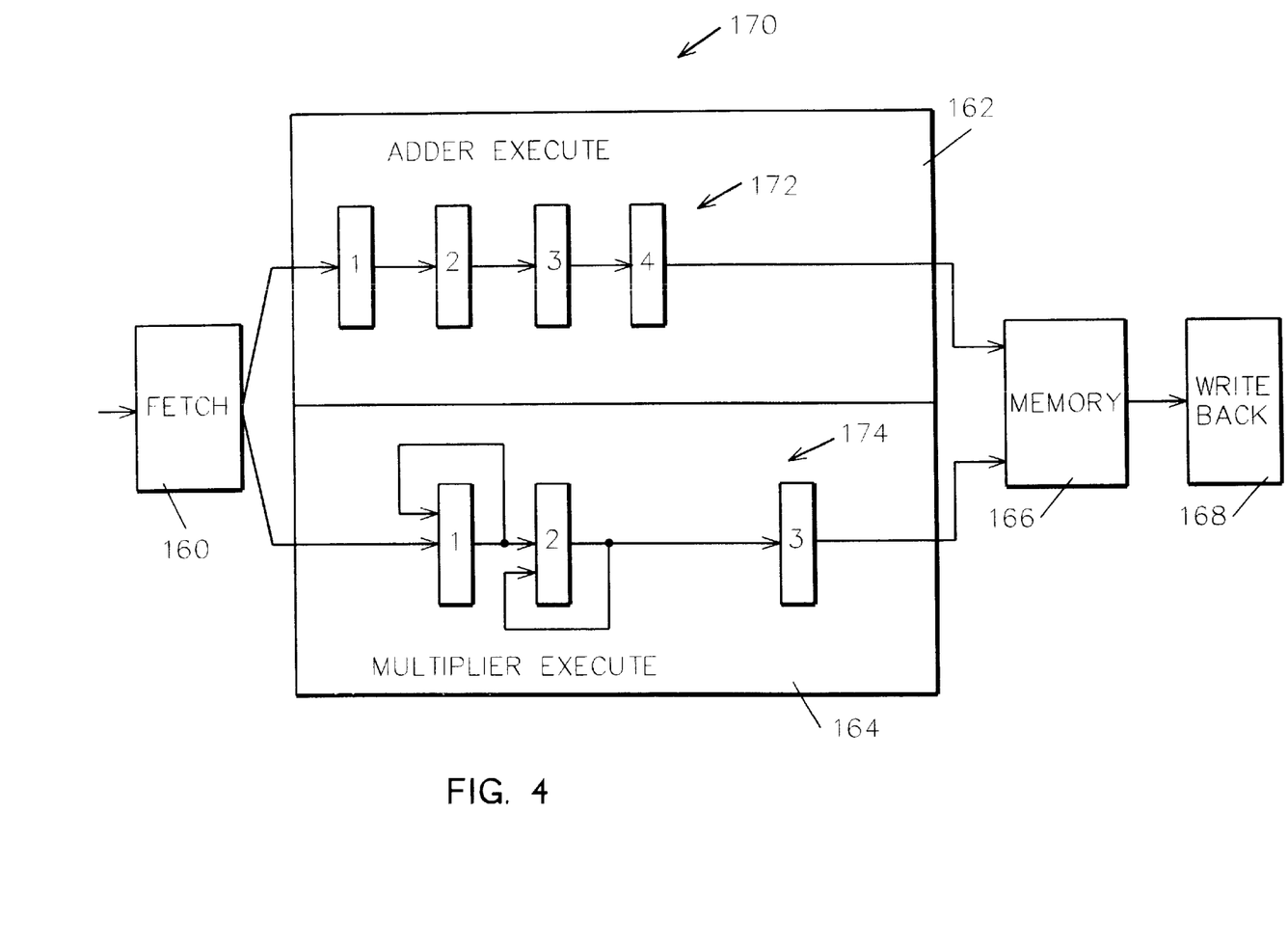
FIG. 4 is a flow chart illustrating parallel execution of adds and multiplies in the execution stage of a pipeline.

Referring to FIG. 4, the parallel execution of add instructions and multiply instructions in the execute stage of a pipeline is depicted. By way of example, a floating point unit (FPU) 170 may be provided which supports add, subtract, multiply, divide, negate, absolute value, and compare operations. This FPU 170 operates in a pipelined fashion, with separate execution pipelines 162, 164 for simple operations (add, subtract, negate, absolute, and compare) and for complex operations (multiply and divide), respectively. FPU pipeline 172 includes four execute stages 172, and FPU pipeline 174 includes three execute stages 174, with feed back loops on stages 1 and 2, which in effect lengthens pipeline 164 beyond the length of simple pipeline 162. Prior pipelining for pre-fetch and decode is provided by a load/store unit 160 outside of FPU 170.

The simple pipeline 162 includes four major stages 172 necessary for completion of addition and subtraction, as follows:

Stage 1: Subtract exponents, shift fraction of minimum exponent right by the resultant difference. Return maximum exponent, shifted fraction and non-shifted fraction.

Stage 2: Add fractions. Return result and maximum exponent.

Stage 3: Count leading zeroes, shift left result by this count. Return count, result, and maximum exponent.

Stage 4: Subtract count from maximum. Return result in IEEE standard numbers.

Since other operations in simple pipeline 162 do not require all four stages 172, they are performed in the first pipeline stage 1, and sent in a pass-through mode through the other stages 2–4 of pipeline 172 in order that they will not complete out of order with other operations in simple pipe 162.

The long, or complex, pipeline 164 includes three major stages 174, including an add/subtract fraction stage 1, a shift fraction stage 2, and an exponent add/subtract stage 3. When executing a divide operation, the add/subtract stage 1 and shift stage 2 are accessed multiple times, possibly causing long stalls if other operations are waiting in pipeline 174.

A multiply operation is accomplished in pipeline 164 in a three stage no feedback manner, similar to the adder, but is considered a long pipeline due to the time required to complete the multiply accumulate (MAC) operation. The operations performed in these three stages 174 are:

Stage 1: Calculate sign of result, calculate partial fraction for low 23 bits, calculate exponent (exa+exb).

Stage 2: Calculate partial fraction for high 32 bits.

Stage 3: Round fraction.

Pipeline latency and conflicts characterize those circuits or systems which will most benefit from the use of this invention. While a system which does not exhibit these characteristics, such as an in-order execution system, also benefits from power conservation, when applied to an out-of-order system, conflicts result in much greater power conservation, since instructions will only be deemed non-critical (and, consequently, powered at a lower Vdd) if conflicts are found with their successors. For example, consider the following instruction sequence:

| a) | Mult | r3,r4 | ;r3=r3*r4 |
| b) | Add | r1,r2 | ;r1=r1+r2 |
| c) | Add | r6,r7 | ;r6=r6+r7 |
| d) | Add | r3,r5 | ;r3=r3+r5, which conflicts with a). |

These instructions execute as illustrated in Table 1:

TABLE 1

Execution Timing Without Variable Vdd

```
Mult Pipe:     .....aaaaaaaaaaaaaaaaaaaaaaaaaaaaa.........
Add Pipe:      .......bbbbbccccc.................ddddd....
```

Operation d is held out due to dependencies. In accordance with the invention, by using this collision information operations b and c can be powered down (use less power, and consequently take longer to execute), resulting in the timing diagram of Table 2:

TABLE 2

Execution Timing With Variable Vdd

Mult Pipe:    .....aaaaaaaaaaaaaaaaaaaaaaaaaaaaaa.........
Add Pipe:     .......bbbbbbbbbbccccccccccccc.....ddddd....

The variable Vdd approach illustrated in Table 2 results in significantly less power consumption and completes the four instructions a, b, c, and d in exactly the same amount of time as illustrated in Table 1. If the system is an out-of-order system, and no conflict detection is included, instructions b and c will not be switched to lower voltage, since they will both be seen as critical.

This feature of separation of pipelines into simple and complex pipelines facilitates optimization of the power and performance attributes of a chip through implementation of the asynchronous execution pipeline power selection method of the preferred embodiment of the invention described hereafter.

In accordance with the preferred embodiment of the invention, pipeline selectable supply voltage (Vdd) for parallel instruction execution makes it possible to balance the performance boost given to critical asynchronous functions by increased voltage supply while also conserving power in other units of the chip performing faster operations in parallel.

In accordance with the invention, higher voltage is provided to time critical instructions, and lower voltage to non-critical instructions. By supplying lower voltages to the non-time-critical pipelines, overall chip power consumption is lessened. The high power unit, or pipeline, will perform very fast, but will consume switching power levels proportional to Vdd squared. This unit also has transitions based on steep inputs, causing greater short circuit current, and therefore more power consumption. The low power non-critical unit, or pipeline, will consume much less power than it would at a high power since Vdd squared will be a less significant factor. Also, there is less short circuit current due to slower input transitions.

Figure 5:
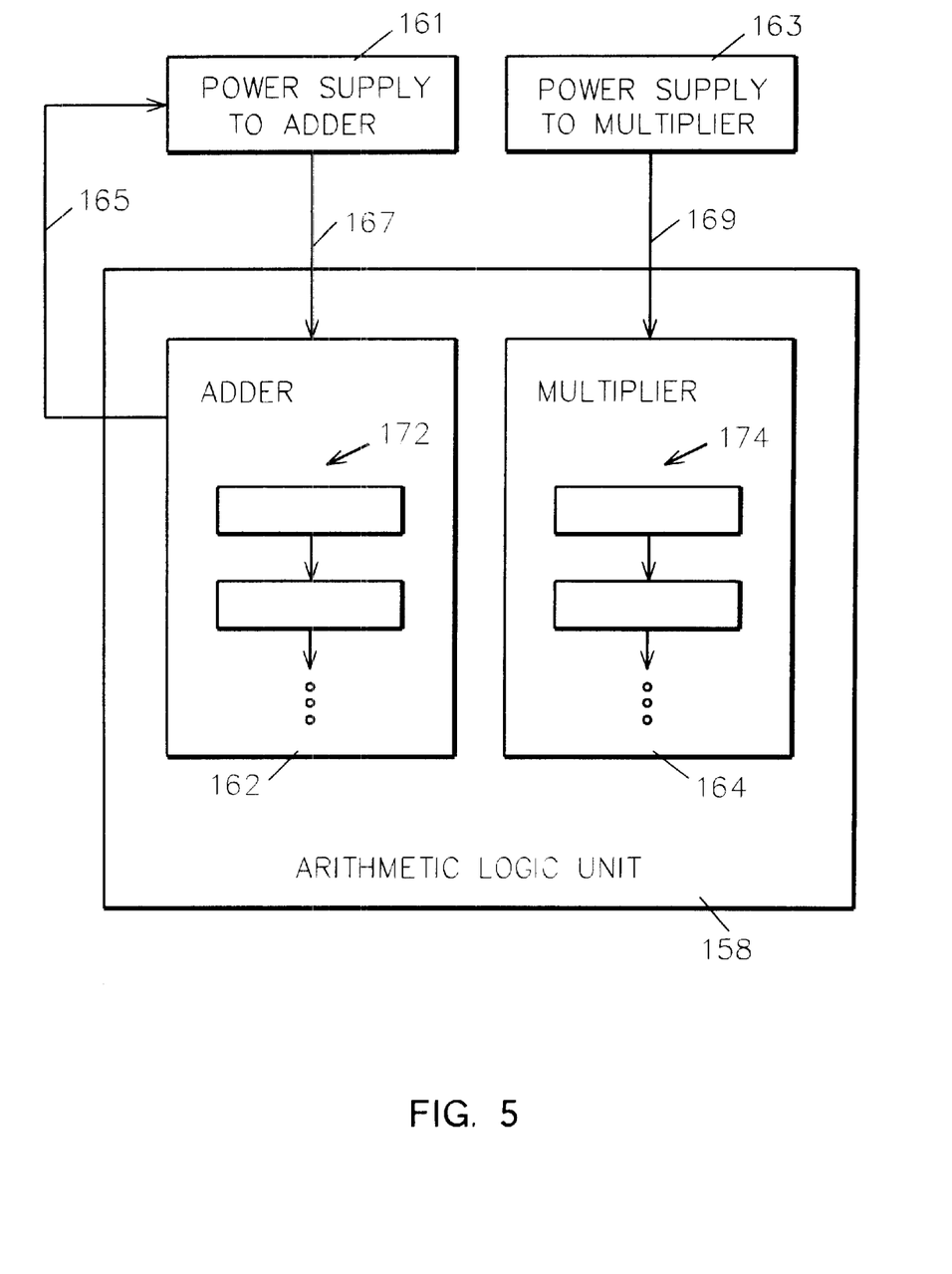
FIG. 5 is a high level system diagram of a preferred embodiment of the invention.

Referring to FIG. 5, in accordance with a preferred embodiment of the invention, a simple implementation of a system involves an arithmetic logic unit (ALU) 158 comprising a multiplier 164 and an adder 162, with the power for adder 162 selected to be lower whenever multiplier 164 is working. Such an embodiment has the advantage that it involves little overhead while conserving power for each add in the pipeline. This embodiment is based on an in order execution system, where the adds cannot be put away (stored) before a preceding multiply. ALU 158 comprises, in this embodiment, two asynchronous pipelines 172, 174 working in parallel. The design of the pipelines involves a normal asynchronous handshaking protocol but also includes the generation of a power signal 165 from the adder that instructs the adder power supply 161 to reduce the voltage 165 supplying the adder if a multiply operation is currently executing in multiplier 164. In this case, the multiply operation is the most critical instruction, and the power supplied on line 169 to multiplier 164 from supply 163 will be the maximum available. With the addition of some additional power supply control logic, this system may be modified to optimize power in the case of hazards which would cause pipeline stalls. This embodiment may be modified to work with more than two parallel units 172, 174 by generating power control signals for each unit in the system.

The power supplied to each unit 162, 164 is supplied by a simple switch (not shown), either implemented in CMOS on chip or externally. This switch is connected to the power control signal by the unit it is supplying. Since the multiplier 164, in this embodiment, will always be deemed most critical its power control signal (not shown) will always set the power control 163 to full voltage. Adder 162 will generate its power control signal 165 by monitoring the activity of multiplier 164, which can be done in the protocol outlined above by connecting the power control signal 165 to the request signal (not shown) going into the multiplier. When the request signal for the multiplier is high, the power 161 to the adder will be set to low voltage on line 167. When the request signal returns to zero, the power 167 to adder 162 is switched back to high voltage.

As will be described more fully hereafter in connection with FIG. 7, in order to communicate the results of a low power addition to the rest of the chip the adder 162 output signals are stepped up to normal voltage by resizing the transistors on the last few gates in the logic or by inserting step up buffers. These gates and buffers step up the low input voltage 167 to the high output voltage by being constructed with very small p-transistors. This smaller size transistor creates a lower transition voltage for the p-transistor(s) in the logic gate, thus allowing the higher voltage to drive the output when a lower voltage is applied at the input. Several stages of these logic books may be needed to supply appropriate amplification of the signal without violating noise margins.

Figure 6:
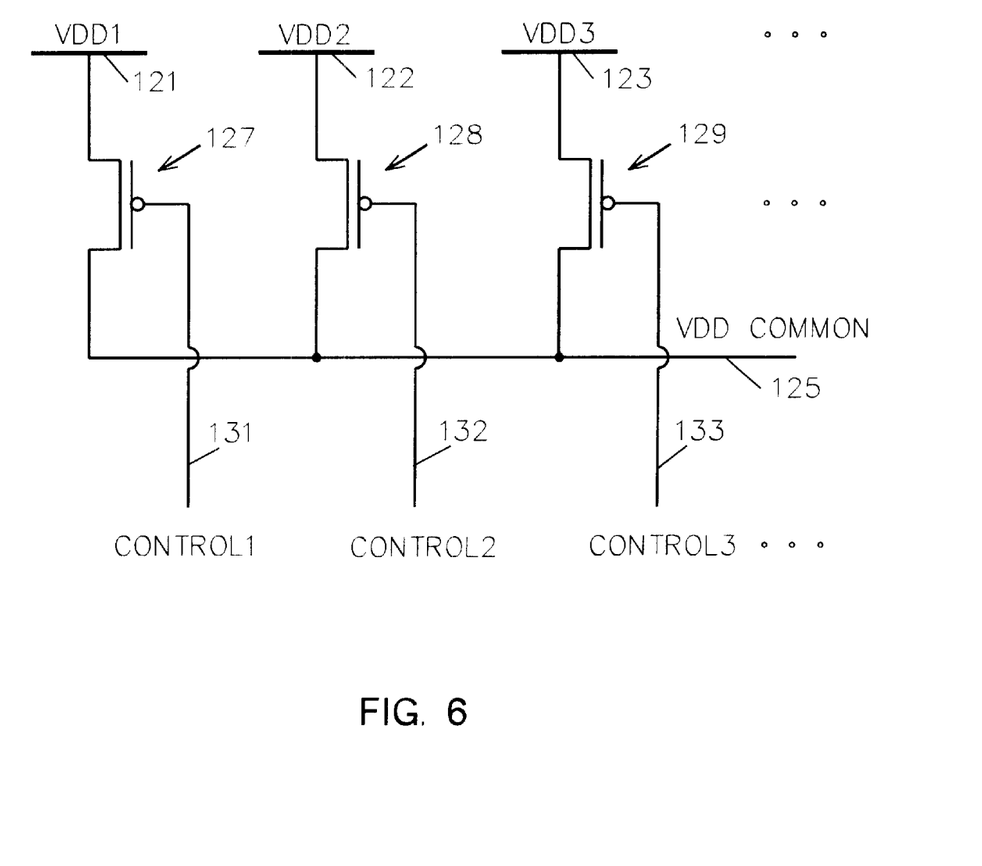
FIG. 6 is a high level circuit diagram illustrating a selectable voltage supply.

Referring to FIG. 6, an example of a selectable voltage supply is illustrated which uses a plurality of voltage supply rails VDD1 121, VDD2 122, VDD3 123, . . . Wide transistors 127–129 are used to power a common voltage rail VDD common 125 under control of control lines 131–133. Alternative switching mechanisms may be employed, and additional components (not shown), such as diodes, may be used to smooth voltage transitions. Pipeline hazard prediction logic may be used to control inputs 131–133 so that switching is made intelligently.

Thus, in accordance with the present invention, power usage due to increased Vdd in an asynchronous chip is reduced by giving individual functional units (any unit that is performing computations resulting from an instruction) a selectable power supply. This is a power supply including a plurality of power supplies independently selectable by the instruction pipeline unit depending on, for example, the status of the functional units and/or the estimated completion times for various instructions.

Referring further to FIG. 6, a plurality of different voltages 121–123 is provided to the chip, with all, or some selection of less than all, of the voltage lines distributed to each of the functional units. The power supplied to each individual unit is then selected from among the voltages by means of a set of very wide p-channel MOS transistors 127–129 in order to reduce resistance and supply enough current to power the functional unit. Due to the increased current required by the circuit at a higher voltage the p-channel MOS transistors would typically range in size, with wider transistors gating the larger voltages and smaller transistors the smaller voltages.

The voltage supplies applied to the chip are, in this preferred embodiment, controlled through selector logic in the instruction pipeline which activates control lines 131–133. Where the chip is capable of detecting data dependencies of instructions for parallel execution, this selector logic automatically switches the voltage of the most critical instruction, that is, the earliest instruction to enter execution that has not yet completed, to the maximum available.

Logic high inputs of a voltage lower than the Vdd for a functional unit could result in the logic in that unit not functioning correctly. Therefore, in order to deselect the power supply provided to a particular execution unit, the power supply logic high voltage in the pipeline unit equals the maximum supply voltage available to the unit. Also, the interconnecting logic between units uses that maximum voltage available to the destination unit.

In order to provide different voltages to different units on a chip, care is taken with respect to cross unit communication and power switching of queued units.

In accordance with the preferred embodiment of the invention, cross unit communication is performed at a uniform power level. Signals being transmitted from a low voltage unit to a high voltage unit are driven close to the high voltage unit Vdd. In order to accomplish this, several amplifying gates are synthesized on the outputs of each power selectable unit. These gates may consist of logic gates, or be non-inverting buffers. Regardless of their function, the Vdd supplied to these gates is the maximum available in the chip and the p-transistors in the gates sized such that they amplify low voltage signals.

Figure 7:
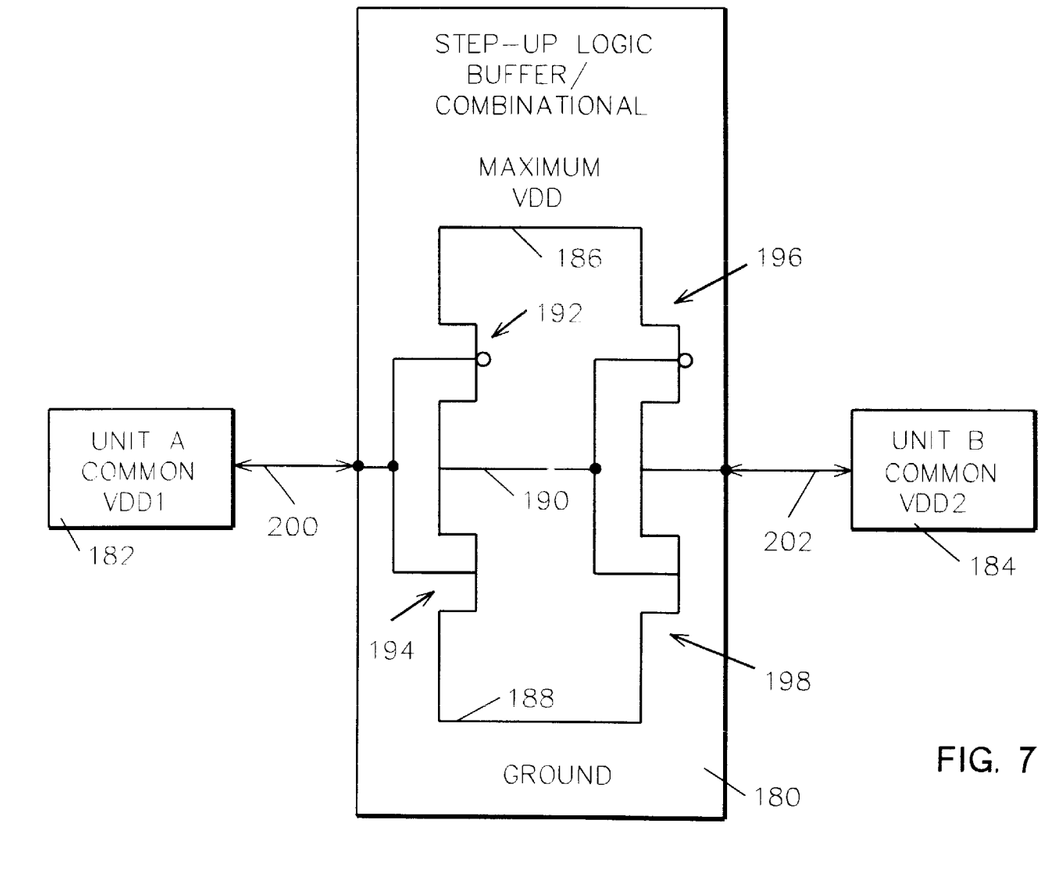
FIG. 7 is a high level circuit diagram illustrating a step up buffer used for communication between two units powered at different voltage levels.

Referring to FIG. 7, buffer 181, with input at line 200 and output at line 202, is connected between maximum Vdd 186 and ground 188 across transistors 192, 194, 196 and 198, and is used as a step up buffer for communication between two units 182 and 184 powered at different voltage levels Vdd1 and Vdd2. In this circuit, the width of P transistor 194 equals the width of N transistor 192 so that the P transistor reaches threshold more quickly.

In accordance with various embodiments of the invention, power switching may be performed during idle times in the unit or during operation.

The safest way to switch execution unit power supplies is during idle times. While this prevents possible glitches due to power selection, it does not provide the flexibility usually required.

Currently, most commercial microprocessors and DSPs rely on some kind of pipeline which queues operations so as to perform sequential operations in a pipelined manner. Superscalar processor designs typically use holding queues in addition to the pipeline for operations that cannot enter the pipeline due to structural hazards. These provide both in order execution and out of order execution, and pipeline Vdd control of the present invention is flexible enough to be useful in both cases.

In order to perform pipeline power controls without significant performance degradation, in accordance with the preferred embodiment of the invention, power is switched on a unit only when it has been made non-critical by data or control hazards in the queue. The system implemented on a chip is viewed as a set of queues with voltage regulated depending on the number of operations waiting to be processed in the queue. A rough estimation of time required for a given operation, called a "time unit", is used to determine when a unit is been made non-critical. The set of queues and associated time units is used to implement the hazard dependent power control methods of the preferred embodiments of the invention.

In an in-order system, the power applied to an execution unit can be decreased by following a simple heuristic: decrease power for all non-critical units in the queue with completion time less than the next executing operation with lower criticality. This heuristic also reduces power for all operations in units prior to a target operation, where the target operation is data dependent on operations in other units (within execution time parameters). In an in-order system there can be only one critical operation at a time.

An example of in-order execution is illustrated in the following Table 3, which represents two pipes in which instructions execute and retire in rank order, meaning the operation with rank 1 will execute and complete first, and the operation with rank 6 will execute and complete last. In Table 3, execution order is read from bottom to top.

TABLE 3

IN-ORDER SYSTEM EXECUTION

| Complex Pipe | | Simple Pipe | | |
|---|---|---|---|---|
| Op | Rank | Op | Rank | Reduced Power | Data Dependency |
| | | Add R1, R2 | 6 | Yes | Yes |
| | | Add R5, R6 | 5 | Yes | No |
| Mult R3, R4 | 3 | Add R7, RB | 4 | Yes | No |
| Mult R1, R2 | 1 | Add R4, R9 | 2 | Yes | Yes |

In the example of Table 3, the multiply with rank 1 causes four subsequent adds to proceed at a reduced power level, provided the sum of their execution times is less than that of the multiply. That is, the multiply must take at least 4 times the execution time of a slowed add. Data dependency can also cause reduced power. Since the Add R1 in the pipe can't proceed until the Mult R1, R2 is finished, the two previous adds are slowed since the multiply will finish much later than the previous operations would. Since the data dependency and retire order will already be available, very little additional circuitry is required to set the power levels. By retire order is meant the order in which the results are used to update registers; it is the same as rank, and is sometimes referred to as execution order.

In an out of order system, the same queue system as is illustrated in Table 3 can be used, but data dependency will provide the only power reduction cases.

In order to optimize Vdd switching of a unit during its operation, the switch occurs from one power level to the other without ever deviating lower than the lowest supply power. This is accomplished by selecting the desired voltage rail before the prior voltage rails are switched off. Power glitches occur in a unit due to two causes: transition from a high voltage to a lower voltage and transition form a low voltage to a higher voltage. At the gate level, each gate is viewed as a simple inverter, which is a reasonable generalization inasmuch as in CMOS technology all gates are essentially specialized inverters. Extreme conditions occur with an input voltage of 0 (ground) and an input voltage of the original Vdd, and analysis at these extremes, with the gate input voltage being the original power selection and Vdd viewed as the newest power selection, will yield worst case results. These input and rail voltage selections are realistic since in an asynchronous circuit, the voltage supply increases before signals can propagate through the circuit at the new voltage level.

As a result of analysis of all four possible cases on the transistor level (Vhi→Vlo, Vlo→Vhi, Vinold, Vingnd), the following parameters for unit design are established.

Dynamic power consumption can be approximated by the following equation:

$$Pd=CL*(Vdd)^2*fp$$

where fp is the switching frequency of the circuit and CL is the capacitive load on the device. This equation assumes a step input and that $$in(t)=CLdVout/dt,$$

where in is the n transistor input current. This equation supports experimental data showing a marked increase of the rate of power consumption when a test device is running at a high voltage versus low.

1. By selectively decreasing the power for non-time-critical units, overall chip power consumption is saved. However, applying this approximation onto all of the circuits for the design would yield incorrect results, since while it takes into account the power consumed by individual units at given supply voltages, it does not take into account the added power consumed by the power control circuitry of the chip.

2. By placing a modified set of logic gates right before the outputs of a unit, they can supply the high voltage required for system communication given low internal voltage in the unit. If the rail voltage is increased before the input voltage can step up to the new Vdd, and if the transistors are sized correctly, output voltages will be well below the noise margin of the following transistor. This approach is used only when very wide noise margins are available.

Figure 8:
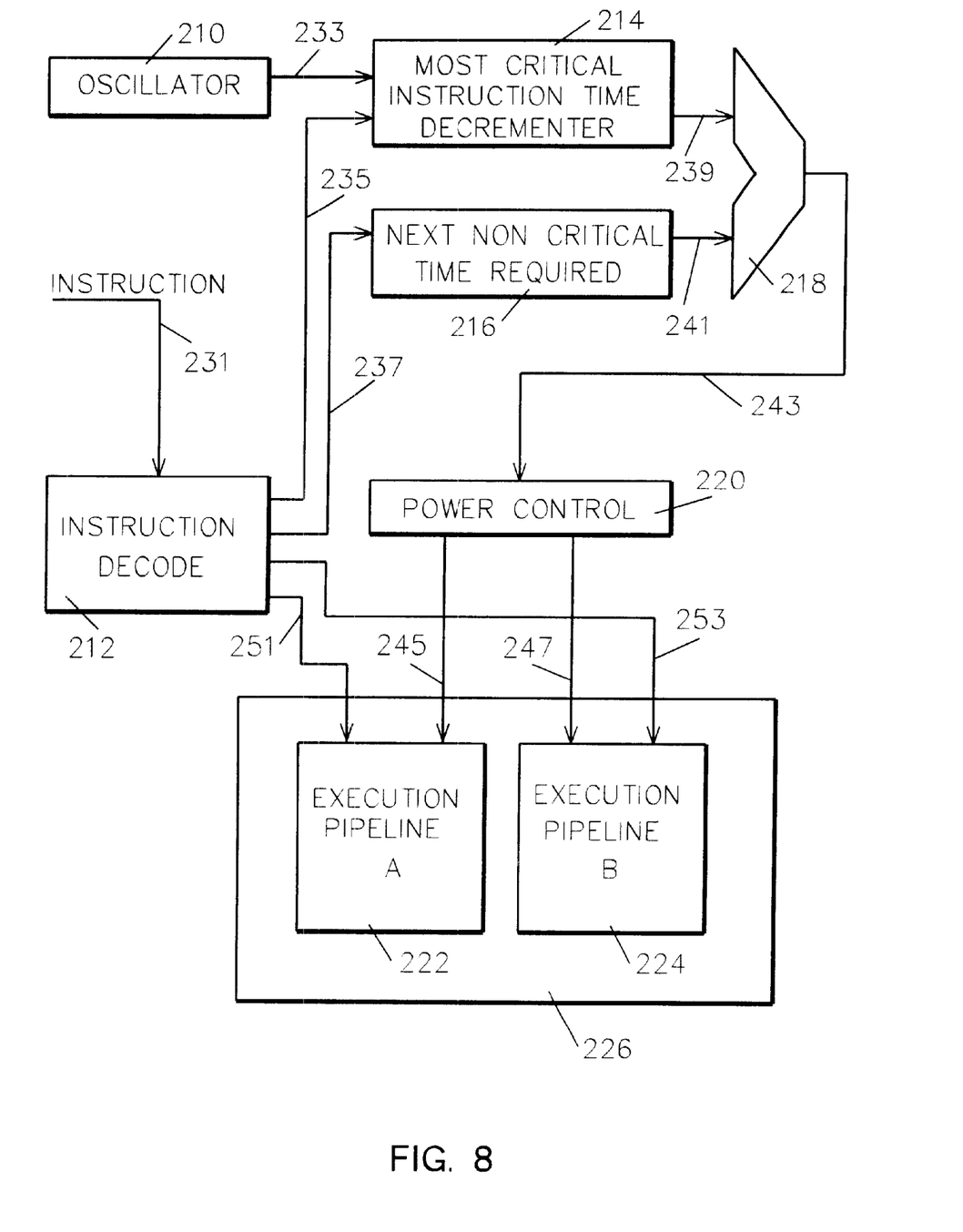
FIG. 8 is a high level circuit diagram of a "careful" system that uses timing information from decode to determine the power supplied to parallel units.

Referring to FIG. 8, in accordance with a further embodiment of the invention, a careful system is provided which is not dangerous in terms of impeding system performance. By including timing information, this system can be more careful in determining voltage levels for the non-critical operations. This is so that when an instruction has a chance of making a transition from non-critical to critical, it is not powered at a lower voltage, thus impeding its time of completion when it becomes critical.

The most critical instruction will generally be given the highest voltage if it is likely to complete after the execution of the less time consuming instructions in the pipeline. The non-critical instructions, those following the critical instruction in the pipeline, must also have their voltage determined. In a safe system, determining the voltage of non-critical instructions requires additional information about instruction times. In one embodiment of the invention, this additional information about instruction times is included in the instruction decode, and includes a representation of the average time required for the execution of the instruction.

Referring to FIG. 8, a high level diagram of a "careful" system is illustrated that uses timing information from decoder 212 to determine the power to be supplied to parallel units 222, 224. Instruction decode generally takes the binary instruction text and breaks that into commands for the machine, and in this embodiment of the invention also decodes an estimate of the instruction time. These instruction times are then used to compare the execution times of two or more parallel executions to determine which instruction is the most critical.

Instructions 231 are decoded in instruction decode block 212, the output of which is fed on line 235 to decrementer 214 along with oscillator 210, to timer block 216 on line 237, and to parallel execution pipelines 222 and 224 on lines 251 and 253, respectively. The output of decrementer is fed on line 239 to order of magnitude subtractor 218, along with a signal on line 241 representing the time required for the next non-critical instruction. The output of subtractor is fed on line 243 to power control 220, which provides power on lines 245 and 247 to execution pipelines 222 and 224, respectively, of execution unit 226.

In operation, this system adapts to instructions 231 in the asynchronous pipelines 222, 224 which may execute at different times by using the time estimates from decode block 212 on lines 235 and 237 to determine voltages on lines 245 and 247. Thus, in this preferred embodiment, the determination of power for a synchronous pipeline machine is provided by a decrementer 214 and comparator 218 for each execution unit. At the beginning of an execution stage 226, the decrementer 214 is loaded with the estimated execution time from instruction decode 212. The voltage of a non-critical unit 222 is adjusted by comparing its decrementer 214 minus a margin to ensure the slowed-down unit does not finish after critical unit 224. If the difference detected by subtractor 218 is an order of two, then the voltage of the execution unit 222 is scaled to provide half performance, and so on based on the magnitude of the difference.

For example, consider the instruction stream 231 of Table 4, all entering the execute stage 226 at the same time:

TABLE 4

| Instruction Stream Execution Time Estimates | |
| --- | --- |
| Instruction | Estimated Time |
| 1. multiply r1, r2, r3 | 64 cycles (100000): critical instruction |
| 2. add r4, r5, r6 | 1 cycle (010000): 64 times faster than the critical instruction |
| 3. load r7, r8 | 32 cycles (0100000): 2 times faster than the critical instruction |

A simple substractor 218 is used to find the order of magnitude difference (in powers of 2) between the longest operation and the shortest operation executing at the same time. The resulting difference is used to determine the power supply going to individual units 222, 224. In this example, given power supplies capable of speeding instruction execution by approximately 4, 2, and 1 times the lowest power speed, the multiply instruction in pipeline 224 is given the highest (4 times performance) power, with an estimated run time of 16 cycles; the add instruction in pipeline 222 is powered with the lowest voltage; and the load instruction is powered with performance equivalent 2 (2 times lowest power speed), making it complete in roughly 15 cycles. The decrementers 214 are decremented by the performance level each cycle to give a true representation of the estimated cycles left in execution.

A similar procedure is followed for an asynchronous pipeline. In this embodiment of the invention, an oscillator 210 with a certain time period is used in the time estimate comparisons. This approach may be adapted to situations where instructions are not executed at the same time, since decrementer 214 shows in every cycle an approximation of the critical remaining time of the critical instruction.

In accordance with the invention, better performance is achieved for an asynchronous chip, or for a chip with asynchronous units, for a given amount of power. It does have the disadvantage that asynchronous operation execution times are often data dependent. In this case, the estimates of remaining time could be off, and voltages adjusted to slow performance of operations deemed to be much faster than the critical instruction. This may be the case in the above example with the multiply instruction executing in 2 cycles. After the multiply completes, however, the voltages are readjusted to assist the next most critical instruction. Overall, the chip performance is boosted, given its power consumption.

In accordance with a further embodiment of the invention, the power consumption of the comparators, simple subtractors, and all other additional logic added to the pipeline is kept lower than the power saved in the rest of the chip by designing the areas of the comparators and decrementers to a minimum.

As a result of implementing the selectable variable voltage supply technique of the preferred embodiment of the invention, variable cycle math instructions are provided. For example, the same adder may take 1 or 2 cycles, depending upon the voltage supply selected to drive the adder.

In alternative embodiments, the voltages supplied on lines 245 and 247 to supply non critical instructions are determined without the use of decrementor 214 and comparator 218. While not as "careful" at making sure critical (or soon to be critical) instructions are powered at high voltages, such a system (deemed "not-careful") still reduces overhead significantly.

Figure 9:
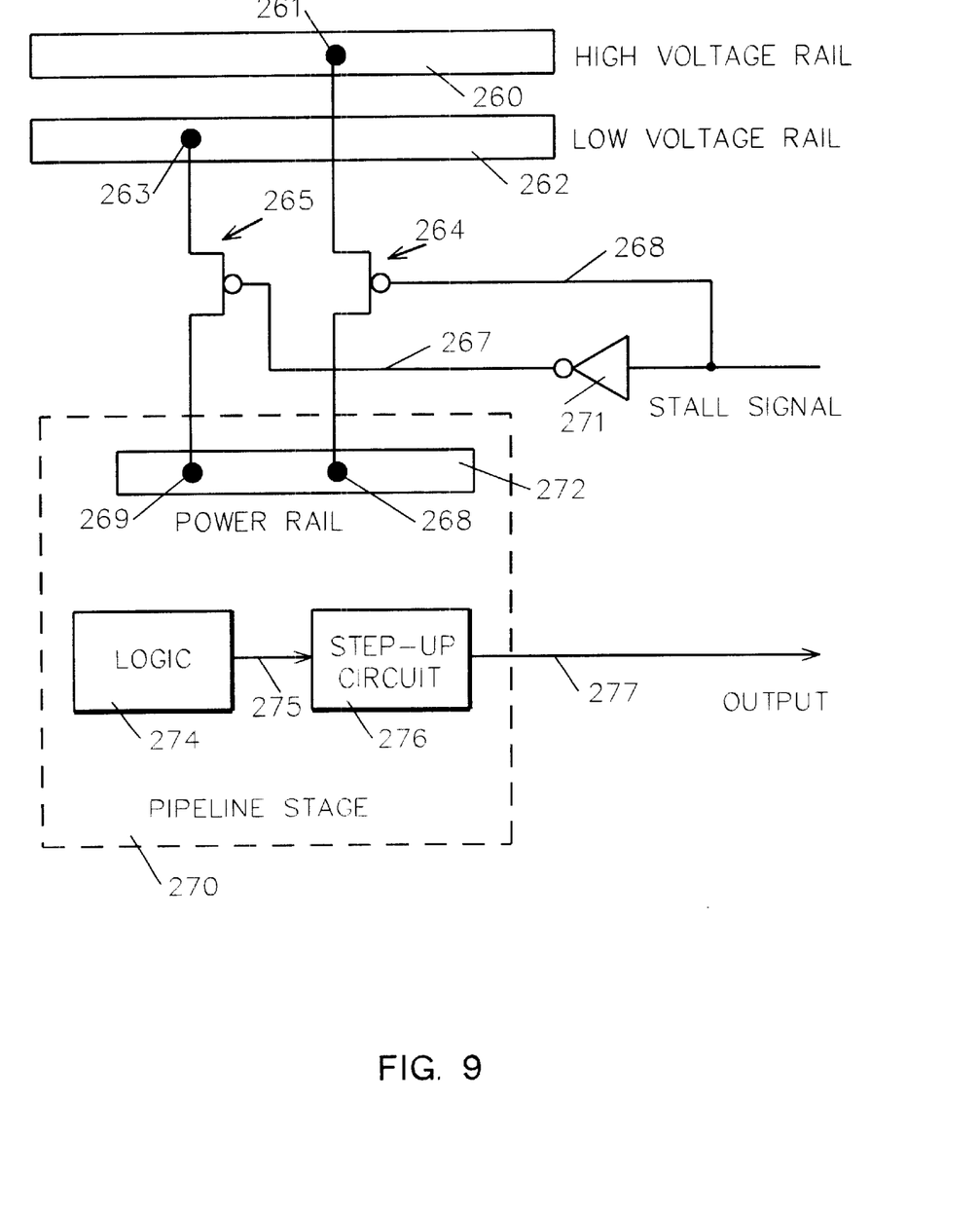
FIG. 9 is a high level circuit diagram of a "not careful" system which switches between two power supplies based on a stall signal.

Referring to FIG. 9, such an alternative embodiment is illustrated as a simple power control circuit switching between two power supplies 260, 262 based on a stall signal 268 generated elsewhere. This circuit represents a system that is not "careful" but still saves considerable power by slowing non-critical instructions. In FIG. 9, high voltage rail 260 and low voltage rail 262 are switched to power rail 272 of pipeline stage 270 under control of stall signal 268 as applied directly to transistor 264 and through diode 271 via line 267 to transistor 265. Pipeline stage 270 includes logic 274 for executing the instruction applied to stage 270, the output of which is fed on line 275 to step up circuit 276, such as buffer 181 illustrated in FIG. 7, and thence to output 277.

Advantages over the Prior Art

It is an advantage of the invention that there is provided an improved system and method of chip powering.

It is a further advantage of the invention that there is provided an improved system and method of chip powering which increases processing speed while reducing power consumption.

It is a further advantage of the invention that there is provided an improved system and method of chip powering where individual execution units are provided selectable power to increase processing speed in critical units while reducing power in less critical units without delaying completion of processing in the critical units.

It is a further advantage of the invention that there is provided a system and method for adjusting the voltage of a system for non-critical operations, slowing only instructions that have extra time to complete due to stalls or other hazards, thereby providing power savings without degrading system performance.

Alternative Embodiments

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Accordingly, the scope of protection of this invention is limited only by the following claims and their equivalents.

We claim:

1. A method for selectively powering a plurality of functional execution units within an architecturally pipelined processor, comprising the steps of:

selectively operating said plurality of execution units in parallel; and responsive to a pipeline stall indication, dynamically scaling power to a first execution unit from a first one of a plurality of power supplies of varying voltages connected to said first execution unit, said pipeline stall indication signaling a future stall in said first execution unit due to data dependency upon a second execution unit.

2. The method of claim 1, further comprising the step of selectively powering a second execution unit from a second one of said plurality of power supplies.

3. The method of claim 2, wherein said second one of said plurality of power supplies provides maximum available voltage, said first one of said plurality of power supplies provides less than said maximum available voltage, and further comprising the step of:

selecting said first one of said plurality of power supplies for powering said first execution unit responsive to said second execution unit executing an operation.

4. The method of claim 3, wherein said first execution unit executes simple operations and said second execution unit executes complex operations.

5. The method of claim 4, wherein said first execution unit executes add instructions and wherein said second execution unit executes multiply instructions.

6. The method of claim 1, comprising the further step of:

stepping up the voltage from a lesser voltage applied to the input of said first execution unit to a higher voltage at the output of said first execution unit.

7. The method of claim 1, comprising the further step of:

selectively powering said first execution unit responsive to a stall signal.

8. The method of claim 2, comprising the further step of operating said first execution unit and said second execution unit asynchronously.

9. The method of claim 2, comprising the further step of operating said first execution unit and said second execution unit synchronously.

10. The method of claim 1, comprising the further step of switching power to said first execution unit during idle time.

11. The method of claim 1, comprising the further step of switching power to said first execution unit during operation of said first execution unit.

12. The method of claim 1, said selectively powering step including the step of predicting pipeline hazards to intelligently control power switching.

13. System for selectively powering a plurality of execution units including first and second execution units within an architecturally pipelined processor, comprising:

a plurality of power sources, with a first power source providing less than maximum voltage and a second power source providing maximum voltage;

means for selectively operating said plurality of execution units in parallel; and means for selectively powering said first execution unit from said first power source dynamically responsive to a pipeline stall indication within said first execution unit due to data dependency upon said second execution unit.

14. The selective power system of claim 13, further comprising:

a voltage step-up circuit for stepping up the voltage supplied to said first execution unit from said first power source to the voltage level of said second power source at the output of said first execution unit.

15. A selective power system, comprising:

a plurality of power sources of different voltage;

a plurality of execution units;

a first switch for supplying power responsive to predicted pipeline stalls in a first execution unit within a microchip due to data dependency upon a second execution unit by selectively dynamically gating power to said first execution unit from a first lower voltage power source; and a circuit for providing power to said second execution unit from a second higher voltage power source.

16. The selective power system of claim 15, wherein said second higher voltage power source provides maximum available voltage, said first lower voltage power source provides less than said maximum available voltage, and wherein said first switch is operable to gate power to said first execution unit when said second execution unit is executing an instruction.

17. The selective power system of claim 15, wherein said first execution unit executes simple operations and said second execution unit executes complex operations.

18. A program storage device readable by a machine, tangibly embodying a program of instructions executable by a machine to perform method steps for selectively powering a plurality of execution units, said method steps comprising:

selectively operating said plurality of execution units in parallel, at least one of said execution units being connected to a plurality of voltage supplies of different voltages; and selectively scaling power to a first execution unit responsive to detected delay in one of said execution units by powering said first execution unit from a first one of said plurality of power supplies, thereby lowering a voltage supplied to a non critical execution unit.

19. An article of manufacture comprising:

a computer useable medium having computer readable program code means embodied therein for selectively powering a plurality of execution units, the computer readable program means in said article of manufacture comprising:

computer readable program code means for causing a computer to effect selectively operating said plurality of execution units in parallel; and computer readable program code means for causing a computer to effect selectively powering a first execution unit responsive to a predicted delay in a critical execution unit from a first one of a plurality of power supplies of varying voltages, thereby lowering a voltage supplied to a non-critical execution unit.

20. A method for selectively powering a plurality of functional execution units within an architecturally pipelined processor, comprising the steps of:

selectively operating said plurality of execution units in parallel;

selectively scaling power responsive to pipeline stalls to a first execution unit from a first one of a plurality of power supplies of varying voltages connected to said first execution unit;

selectively powering a second execution unit from a second one of said plurality of power supplies;

said second one of said plurality of power supplies providing maximum available voltage and said first one of said plurality of power supplies providing less than said maximum available voltage; and selecting said first one of said plurality of power supplies for powering said first execution unit responsive to said second execution unit executing an operation.

21. The method of claim 20, wherein said first execution unit executes simple operations and said second execution unit executes complex operations.

22. The method of claim 21, wherein said first execution unit executes add instructions and wherein said second execution unit executes multiply instructions.

23. A method for selectively powering a plurality of functional execution units within an architecturally pipelined processor, comprising the steps of:

selectively operating said plurality of execution units in parallel;

selectively scaling power responsive to pipeline stalls to a first execution unit from a first one of a plurality of power supplies of varying voltages connected to said first execution unit; and said selectively powering step including the step of predicting pipeline hazards to intelligently control power switching.

24. A selective power system, comprising:

a plurality of power sources of different voltages;

a plurality of execution units;

a first switch for supplying power responsive to predicted pipeline stalls to a first execution unit within a microchip by selectively gating power to said first execution unit from a first power source and a second power source;

a circuit for providing power to a second execution unit from said second power source;

said second one of said plurality of power supplies providing maximum available voltage and said first one of said plurality of power supplies providing less than said maximum available voltage; and said first switch being operable for gating power to said first execution unit when said second execution unit is executing an instruction.

* * * * *